United States Patent
Sato et al.

(10) Patent No.: US 9,030,737 B2
(45) Date of Patent: May 12, 2015

(54) 3D DISPLAY DEVICE AND METHOD

(71) Applicant: Fujitsu Limited, Kawasaki-shi (JP)

(72) Inventors: Teruyuki Sato, Tama (JP); Mineo Moribe, Kobe (JP); Takahiro Umada, Akashi (JP); Hiroyasu Yoshikawa, Akashi (JP); Takashi Itoh, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 13/747,097

(22) Filed: Jan. 22, 2013

(65) Prior Publication Data

US 2013/0258461 A1    Oct. 3, 2013

(30) Foreign Application Priority Data

Mar. 29, 2012  (JP) ................. 2012-076801

(51) Int. Cl.
G02B 27/22 (2006.01)
G02B 27/01 (2006.01)

(52) U.S. Cl.
CPC ............... *G02B 27/01* (2013.01); *G02B 27/22* (2013.01); *G02B 27/017* (2013.01); *G02B 2027/0134* (2013.01); *G02B 2027/0178* (2013.01); *G02B 2027/014* (2013.01); *G02B 27/0172* (2013.01)

(58) Field of Classification Search
None
See application file for complete search history.

(56) References Cited

U.S. PATENT DOCUMENTS

2011/0090419 A1 *  4/2011  Yokoyama .................. 349/57

FOREIGN PATENT DOCUMENTS

| JP | 2002-328335 A | 11/2002 |
| JP | 2004-272040 A | 9/2004 |
| JP | 2010-60773 A | 3/2010 |
| JP | 2011-145488 | 7/2011 |
| JP | 2011-215176 | 10/2011 |

OTHER PUBLICATIONS

Kajiki, Yoshihiro; http://seika-kokai.nict.go.jp/doc/result/199611005/199611005_houkoku-04.pdf; "3-8 Research on three-dimensional vision of super multi-eye area" (2012), with partial English translation.
Chinese Office Action issued Dec. 2, 2014 for corresponding Chinese Patent Application No. 201210587599.4, with English Translation, 16, pages.

* cited by examiner

*Primary Examiner* — Jade R Chwasz
(74) *Attorney, Agent, or Firm* — Fujitsu Patent Center

(57) ABSTRACT

A 3D display device that includes: a first optical section of focal distance f1 provided with a group of small lenses arrayed along a specific direction; and a second optical section of focal distance f2 that converges N beams of parallel light that are emitted from the first optical section and hit the individual small lenses by converging so as to offset the N beams from an optical axis. A distance d1 between the first optical section and the second optical section satisfies $f2-f1 \leq d1 \leq f2$ and a viewing distance d2 from the second optical section satisfies $d2 \approx f2$.

6 Claims, 16 Drawing Sheets

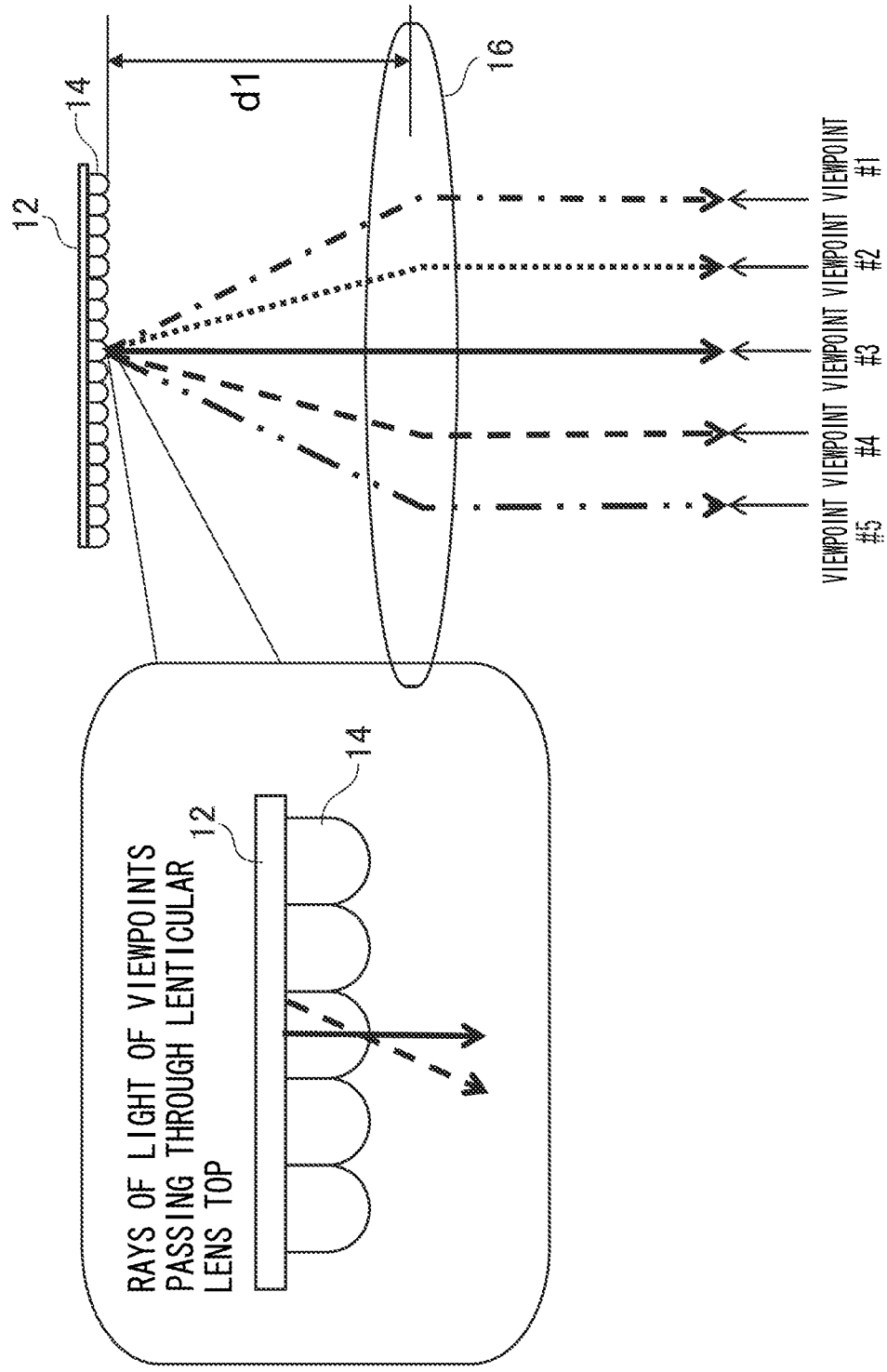

3D DISPLAY DEVICE AND METHOD

CROSS-REFERENCE TO RELATED APPLICATION

This application is based upon and claims the benefit of priority of the prior Japanese Patent Application No. 2012-076801, filed on Mar. 29, 2012, the entire contents of which are incorporated herein by reference.

FIELD

The embodiments discussed herein are related to a 3D display device and 3D display method.

BACKGROUND

Head Mounted Displays (HMD) are known as displays worn by a person in wearable computing. There are expectations for HMDs as devices to assist workers since both hands are free when in the mounted state. HMDs have main configuration elements of a display section for displaying an image such as a video image, and an eyepiece that places the distance of distinct vision of the display section further away. In an HMD there is generally a pair of sets of a display section and an eyepiece provided for the left eye and for the right eye, with it being possible to view an independent image with each respective eye. Such HMDs function as ordinary 2D displays by displaying the same image as the left eye image and the right eye image, and function as 3D displays by displaying separate parallax images as the left eye image and the right eye image, enabling a perception of depth to be achieved by binocular vision.

There are proposals for HMDs capable of switching from 2D display to 3D display configured with a lenticular lens provided between the display section and the eyepiece so as to split left and right image light in different directions.

Known issues in displaying 3D images using binocular parallax are the susceptibility of the observer to an un-natural feeling, and the large eyestrain of the observer. There are proposals for multi-view 3D display methods and super-multi-view 3D display methods as countermeasures thereto.

Explanation first follows regarding a multi-view 3D display method, with reference to FIG. 14. A multi-view 3D display method is technology that displays a nearly natural 3D image by creating plural viewpoint images in space according to the viewing position so as to render "motion parallax", a view that changes with head movement. As illustrated in FIG. 14, in typical multi-view 3D displays the viewpoint images are disposed with a separation that is the interocular distance. The viewable 3D image thereby changes according to the viewing position, rendering motion parallax.

Explanation follows regarding a super-multi-view 3D display method, with reference to FIG. 15A, FIG. 15B, FIG. 16A and FIG. 16B. Rays of light that hold the cue to human perception of 3D space are rays of light that pass through the pupils of the left and right eyes out of a continuity of rays of light emanating from an actual object. The sampling interval in a multi-view method as illustrated in FIG. 15A is too coarse to sample the natural continuity of rays of light referred to above. Thus, a sampling interval is made narrower than the pupil diameter as a super-multi-view 3D display method illustrated in FIG. 15B. In the super-multi-view 3D display method the sampling interval is made narrower than the pupil diameter as illustrated in FIG. 15B, and a slight parallax is also imparted between respective images formed by individual rays of light that are more narrowly separated than the pupil diameter. When rays of light from images with a slight parallax enter the eyeball at the same time, as illustrated in FIG. 16A, when lens in the eyeball is focused on the plane of a screen, then viewpoint images $P_{R1}$, $P_{R2}$ are projected as two isolated images at two different locations on the retina. This is perceived as blurring on the retina. Due to the action of the brain to avoid blurred vision, an adjusting stimulation to the lens in the eyeball is induced so as to adjust from a state in which two isolated images are visualized to at state in which a single image is visualized on the retina as illustrated in FIG. 16B, in which the lens in the eyeball is focused on a 3D image.

When an observer is looking at a natural object, the two eyes converge on a position in space where the object is perceived and also adjust their focal point to match. Namely, by adjusting movement towards a position in space where an object is perceived, the two isolated images arising from binocular parallax are avoided and by matching focus a state is achieved in which it is no longer possible to distinguish from a state of looking at a natural object. In other words natural stereoscopic vision is enabled.

RELATED PATENT DOCUMENTS

Japanese Laid-Open Patent Publication No. 2011-145488

SUMMARY

According to an aspect of the embodiments, a 3D display device is provided. The 3D display device includes: a display section that extracts respective single pixels from corresponding N individual images with mutually different viewpoints, that composes an elemental pixel by arranging the N extracted pixels in a specific sequence along a specific direction for all the pixels of the N individual images and that displays a combined image in which the N individual images have been combined; a first optical section of focal distance f1 provided with a group of small lenses arrayed along the specific direction, the respective individual small lenses being disposed along the specific direction so as to each correspond to mutually different single display regions of the elemental pixels in the display section and the respective individual small lenses separating rays of light emitted from the N pixels of the corresponding elemental pixels into N beams of parallel light with mutually different light ray directions; and a second optical section of focal distance f2 that converges the N beams of parallel light that are emitted from the first optical section and hit the individual small lenses by converging so as to offset the N beams from the optical axis. A distance d1 between the first optical section and the second optical section satisfies $f2-f1 \leq d1 \leq f2$ and a viewing distance d2 from the second optical section satisfies $d2 \approx f2$.

The object and advantages of the invention will be realized and attained by means of the elements and combinations and particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a schematic explanatory diagram of a process for deriving optical conditions;

DESCRIPTION OF EMBODIMENTS

Figure 1:
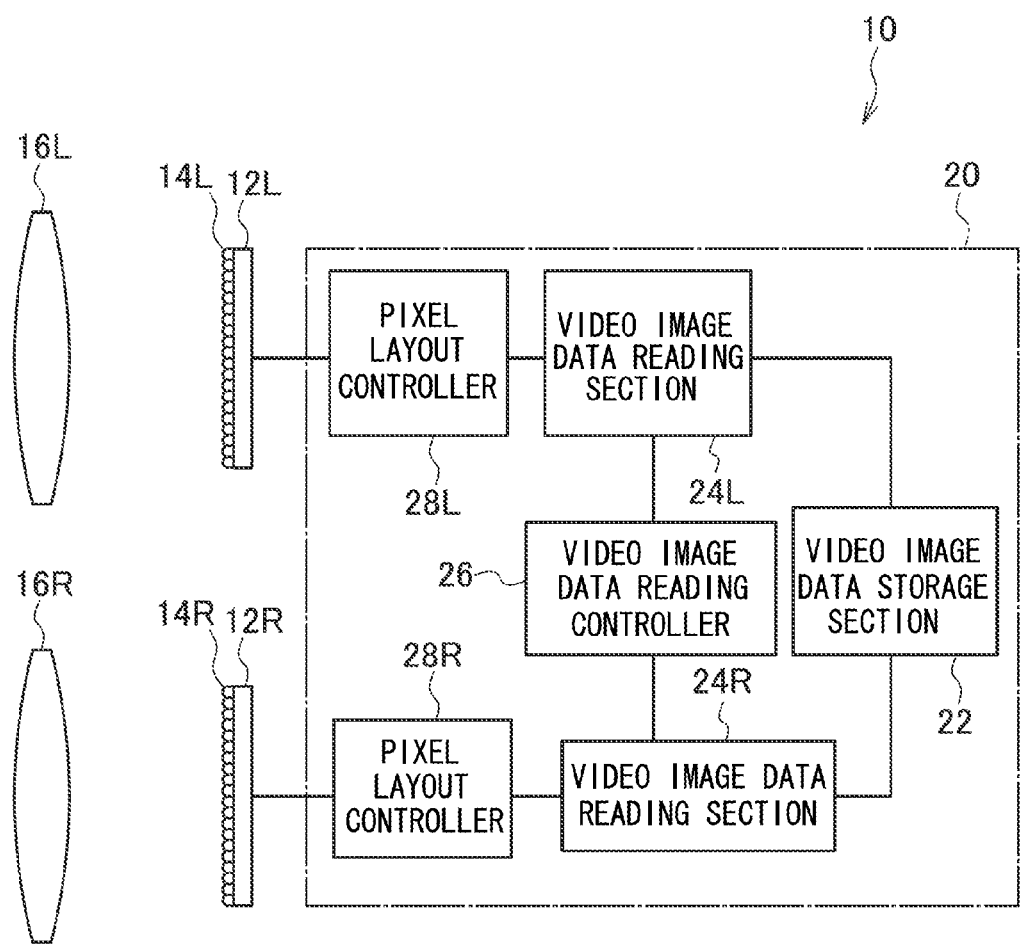
FIG. 1 is a schematic configuration diagram of an HMD explained in an exemplary embodiment.

Detailed explanation follows regarding an example of an exemplary embodiment of technology disclosed herein, with respect to the drawings. FIG. 1 illustrates an HMD 10 according to the present exemplary embodiment. Note that in FIG. 1, and in FIG. 2 and FIG. 3, described later, the suffix "L" is appended to reference numbers of configuration elements for the left eye and the suffice "R" is appended to reference numbers of configuration elements for the right eye for discrimination purposes.

The HMD 10 is provided with two optical systems, each equipped with a display 12, a lenticular lens 14 adhered to the front face of the display 12, and an eyepiece 16 disposed at a separation from the lenticular lens 14. Displays such as a Liquid Crystal Display (LCD) or an organic Electro Luminescence (EL) display may be employed as the display 12. The eyepiece 16 is provided in order to allow an observer look at a virtual image to virtually lengthen the otherwise short distance to the display 12.

However, the lenticular lens 14 is composed of plural long thin shaped small lenses (elemental lenses) of semicircular cross-section profile disposed alongside each other in a row along the small lens width direction. The HMD 10 is a device capable of displaying a 3D image applied with a super-multi-view 3D display method. Each of the elemental lenses of the lenticular lens 14 has a width corresponding to the same number of pixels N on the display face of the display 12 as the number N of the viewpoints along each of the elemental lenses width direction. Note that as an example, FIG. 5 described later illustrates when N=5, a state in which each of the elemental lenses of the lenticular lens 14 respectively corresponds to N=5 individual pixels.

Note that the display 12 is an example of a display section of the technology disclosed herein, the lenticular lens 14 is an example of a first optical section of the technology disclosed herein, and the eyepiece 16 is an example of a second optical section of the technology disclosed herein.

Figure 2:
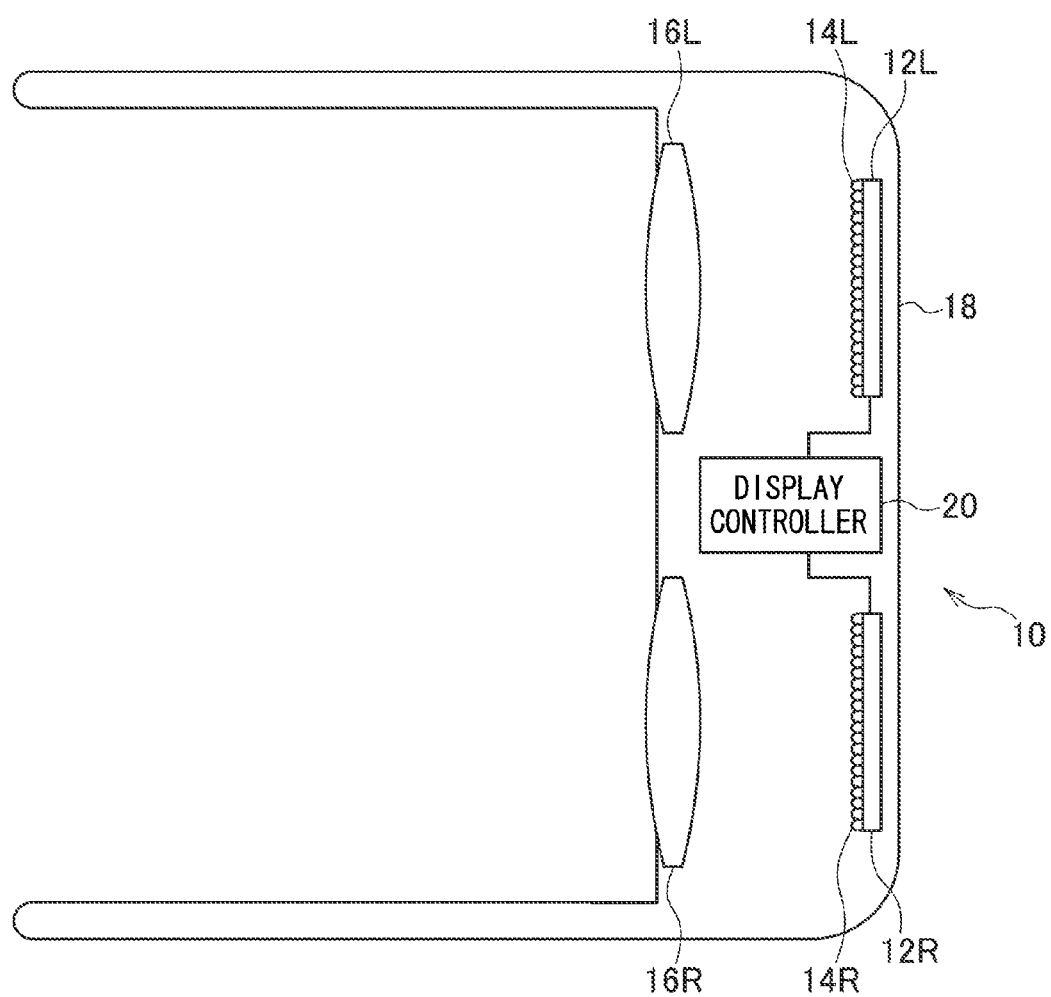
FIG. 2 is a schematic plan view illustrating a layout of an optical system in a housing body of an HMD.
Figure 3:
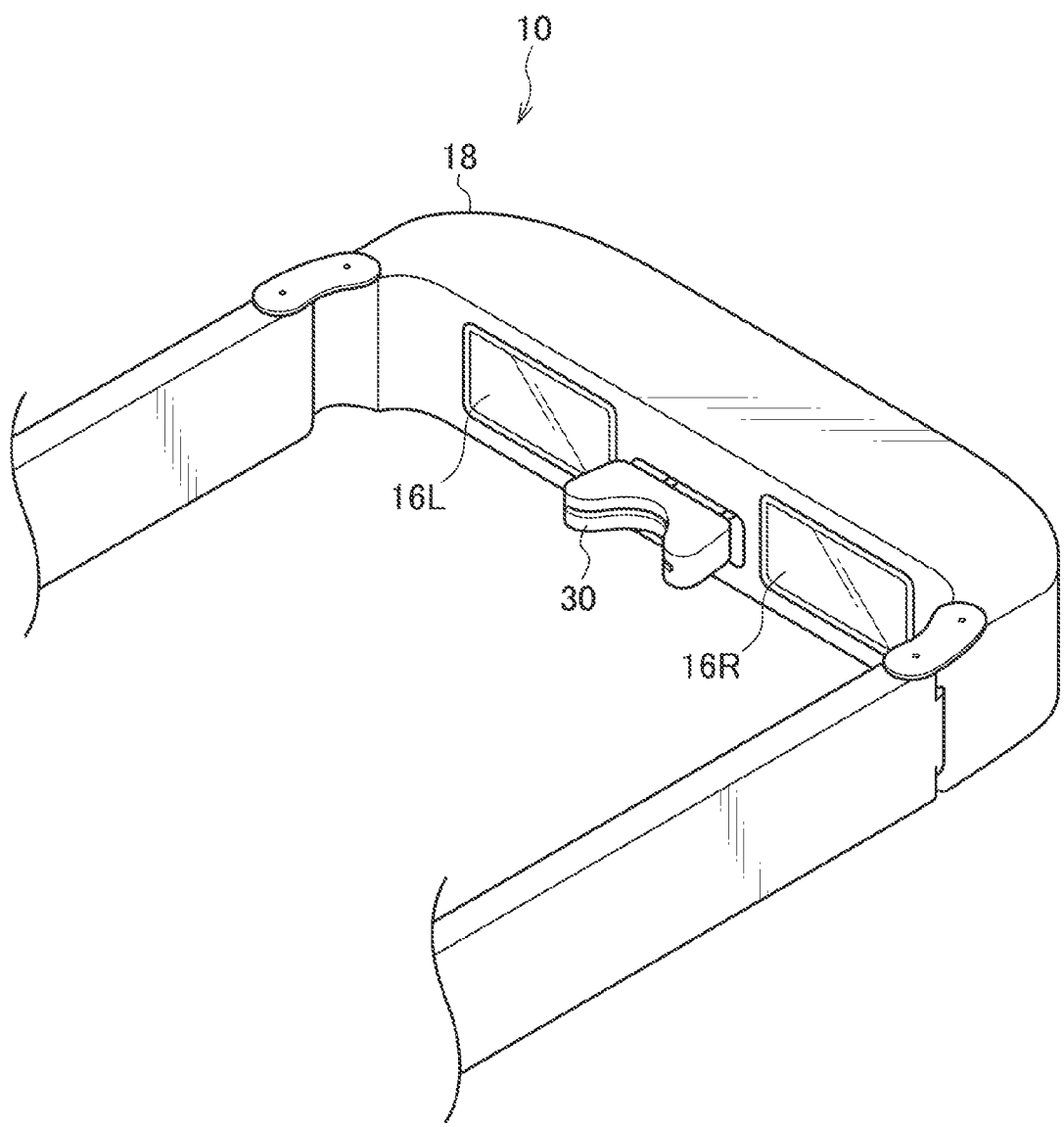
FIG. 3 is a perspective view illustrating the external appearance of a housing body of an HMD.

As illustrated in FIG. 2, the above optical systems are respectively disposed in the housing body 18 of the HMD 10 at a position corresponding to the left eye and a position corresponding to the right eye. The optical systems are disposed with the eyepiece 16 side on the side nearest to the eye, and with the array directions of the elemental lenses of the lenticular lenses 14 respectively disposed to correspond to the left-right direction of the HMD 10. Note that, as illustrated in FIG. 3, a nose pad 30 is attached to a housing body 18 of the HMD 10, and the nose pad 30 is in contact with the nose of a user when the HMD 10 is worn by the user.

A display controller 20 is disposed between the two sets of optical systems in the housing body 18 of the HMD 10. The two individual displays 12 are each connected to the display controller 20. As illustrated in FIG. 1, the display controller 20 is equipped with a video image data storage section 22, a pair of video image data reading sections 24, a video image data reading controller 26 and a pair of pixel layout controllers 28.

The video image data storage section 22 stores N individual (N≥2) sets of video image data with mutually different viewpoint positions along the left-right direction as video image data for the left eye and the right eye. The video image data reading controller 26 controls reading of video image data from the video image data storage section 22 by the pair of video image data reading sections 24. The video image data reading section 24L reads respective N individual sets of video image data with mutually differing viewpoint positions as video image data for the left eye, and outputs the read N individual sets of video image data to the pixel layout controller 28L. The video image data reading section 24R reads respective N individual sets of video image data with mutually differing viewpoint positions as video image data for the right eye, and outputs the read N individual sets of video image data to the pixel layout controller 28R.

Figure 4:
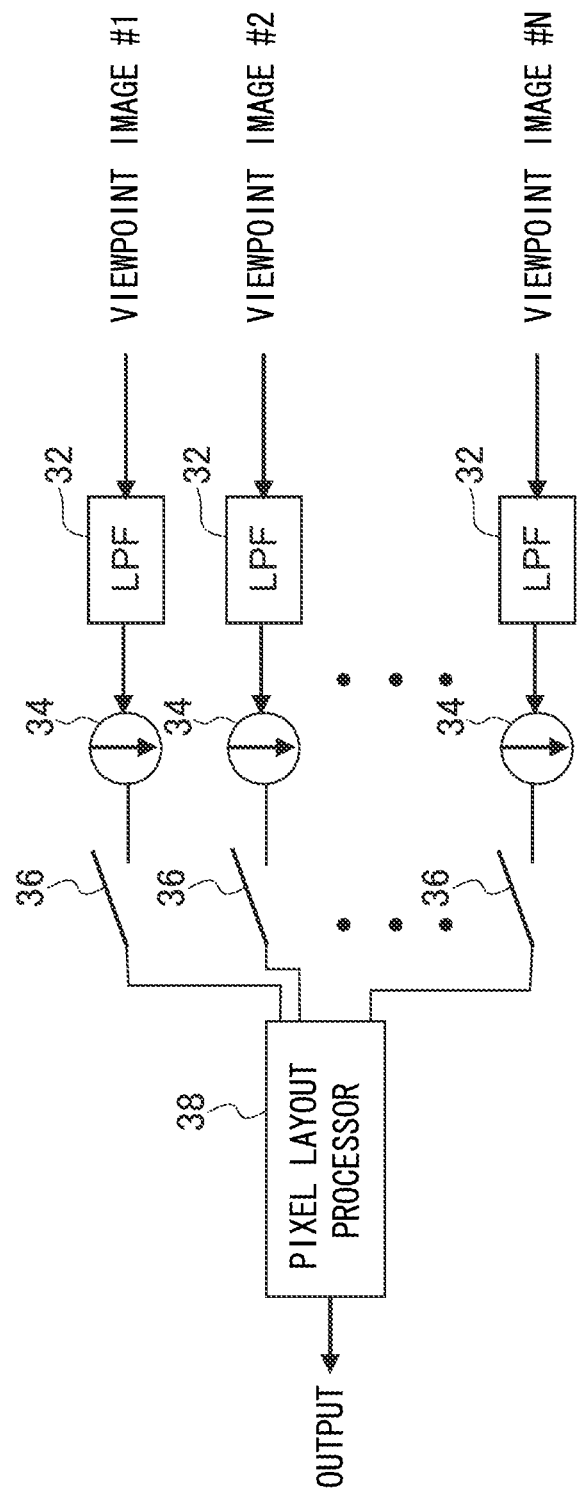
FIG. 4 is a block diagram illustrating a schematic configuration of a pixel layout controller.

As illustrated in FIG. 4, in which the number of viewpoints is N, the pair of pixel layout controllers 28 are each equipped with N individual low pass filters (LPF) 32, N individual down-sampling sections 34, N individual selecting sections 36 and a pixel layout processor 38. The N individual LPFs 32 perform respective processing to remove high frequency components as pre-processing to lower the resolution in the image left-right direction on each frame of the N individual sets of video image data of differing viewpoint position that have been input from the video image data reading sections 24 (indicated in FIG. 4 by viewpoint image #1 to #N). The N individual down-sampling sections 34 perform down-sampling on each frame of the N individual sets of video image data output from the LPFs 32 to lower the resolution to 1/N by thinning pixels in the image left-right direction to a factor of 1/N pixels.

The N individual selecting sections 36 and the pixel layout processor 38 extract one individual pixel respectively from the N individual frames corresponding to the N individual sets of video image data, and compose elemental pixels by arranging the extracted N pixels in a specific sequence. This processing is performed for all the pixels in the N individual frames. The above elemental pixels are collections of N individual pixels, with the elemental pixels corresponding to each of the elemental lenses of the lenticular lens 14. The arrangement sequence of the N individual pixels in each of the elemental pixels is the reverse sequence to the sequence of the viewpoint positions along the left-right direction of the original frames (video images) from which the N individual pixels are extracted. A single frame image is generated by the N individual selecting sections 36 and the pixel layout processor 38 combining N individual frames for each of the frames of N individual sets of video image data.

Explanation follows regarding operation of the present exemplary embodiment. In the HMD 10 according to the present exemplary embodiment, the lenticular lenses 14 are adhered to the display face of the displays 12 in order to render a super-multi-view 3D display method. Accordingly, the direction of light emitted changes between each of the N individual pixels composing a single elemental pixel corresponding to a given individual elemental lens of the lenticular lens 14. The light from the pixel positioned at the center of an elemental lens of the lenticular lens 14 is emitted straight ahead, and light from a pixel shifted from the center of the elemental lens is emitted in a direction at an angle according to the amount of shift from the center of the elemental lens.

Figure 5:
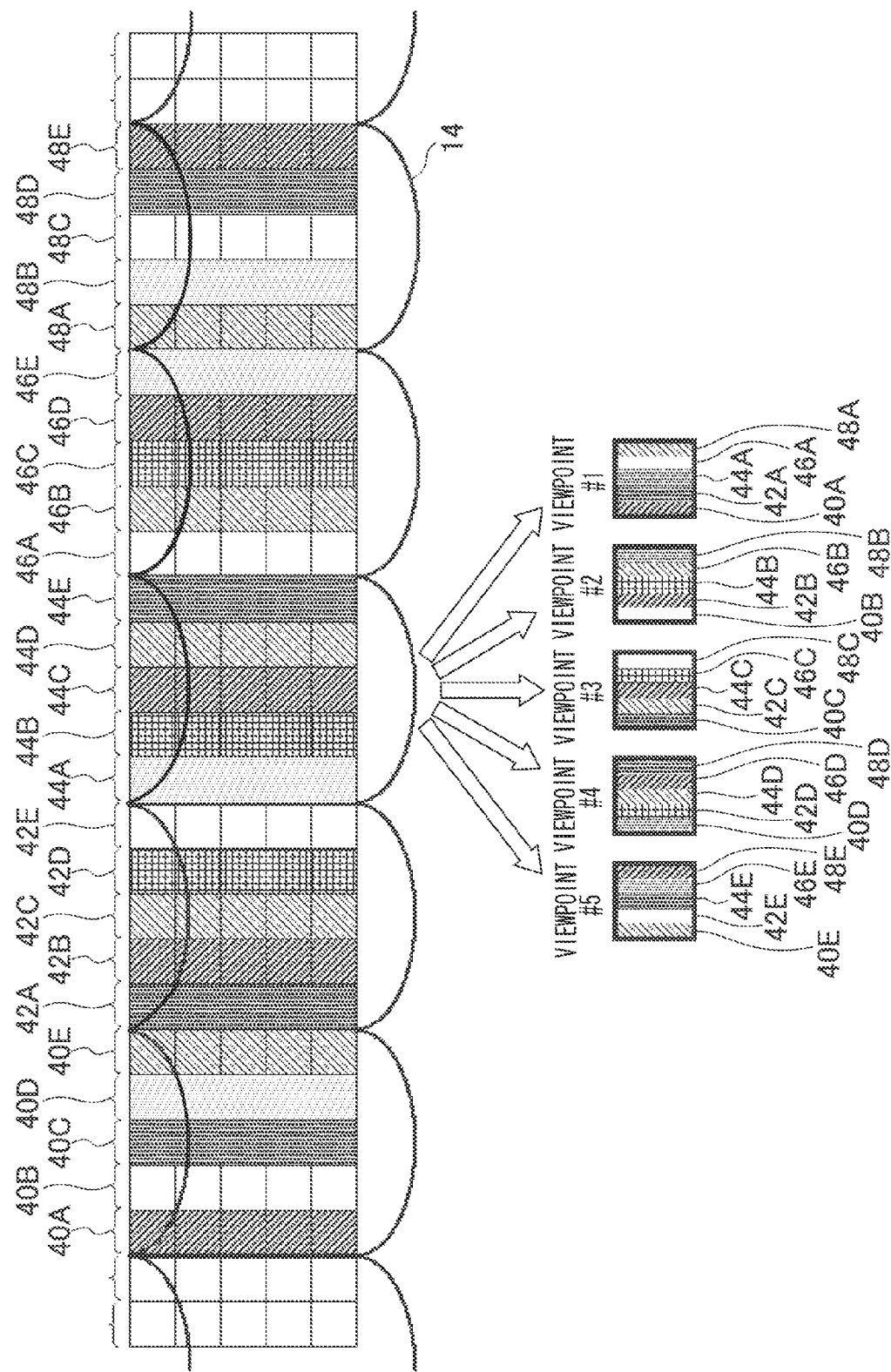
FIG. 5 is a schematic diagram illustrating pixels corresponding to each elemental lens of a lenticular lens when N=5 and respective different images of 5 individual viewpoints formed by lenticular lenses.

For convenience, explanation follows regarding a case in which N=5 with reference to FIG. 5. The viewpoint when viewing the display 12 adhered to the lenticular lens 14 from face-on is the viewpoint #3 positioned at the center of the 5 viewpoints, viewpoint #1 to viewpoint #5, illustrated in FIG. 5. For example, the image formed at the viewpoint #3 (this image is referred to as a viewpoint image) contains the pixel row 40C, 42C, 44C, 46C, 48C positioned at the centers of each of the elemental lenses of the lenticular lens 14. Moreover, for example, the viewpoint image formed at the viewpoint #4 adjacent to the left of the viewpoint #3 contains the pixel row 40D, 42D, 44D, 46D, 48D positioned in the pixel rows adjacent to the right of the center of each of the elemental lenses of the lenticular lens 14. Moreover, for example, the viewpoint image formed at the viewpoint #1 at the right hand edge contains the pixel row 40A, 42A, 44A, 46A, 48A positioned at the left hand edge of the pixel rows corresponding to each of the elemental lenses of the lenticular lens 14. Similar applies to the viewpoints #2 and #5.

As described above, the viewable image, namely the viewpoint image, changes as the viewpoint changes and the viewing direction changes. The direction in which light is emitted, namely the viewpoint, changes according to the position of each pixel out of the N individual pixels corresponding to each respective elemental lens. A single pixel in a viewpoint image corresponds to a single elemental lens of the lenticular lens 14. Pixels that are at the same position in each of the individual viewpoint images are formed by light emitted from pixels corresponding to the same elemental lens of the lenticular lens 14. Namely, for example in FIG. 5, the pixel row 44A to 44E positioned at the centers of the viewpoint images of the viewpoint #1 to viewpoint #5 is corresponding to the elemental lens that is positioned at the center of the lenticular lens 14.

Many viewpoint images are formed in a multi-view 3D display method and a super-multi-view 3D display method, however viewpoint images between the left and right eyes are not formed. In the HMD 10 according to the present exemplary embodiment, there are two of the optical systems each equipped with the display 12, the lenticular lens 14 and the eyepiece 16 provided so as to correspond to the left and right eyes. A simple configuration suffices since each of the individual optical systems can form plural viewpoint images with good efficiency for the left and right eye respectively.

Explanation follows regarding a viewpoint image viewed through the eyepiece 16. As illustrated in an enlarged view at the right hand side of FIG. 6, parallel light is emitted from a light emission portion at the display face of the display 12 to which the lenticular lens 14 is adhered. The parallel light has an emission angle θ according to the shift amount x from the center of each of the elemental lenses of the lenticular lens 14. Note that the focal position of the lenticular lens 14 is aligned with the display face of the display 12.

Figure 6:
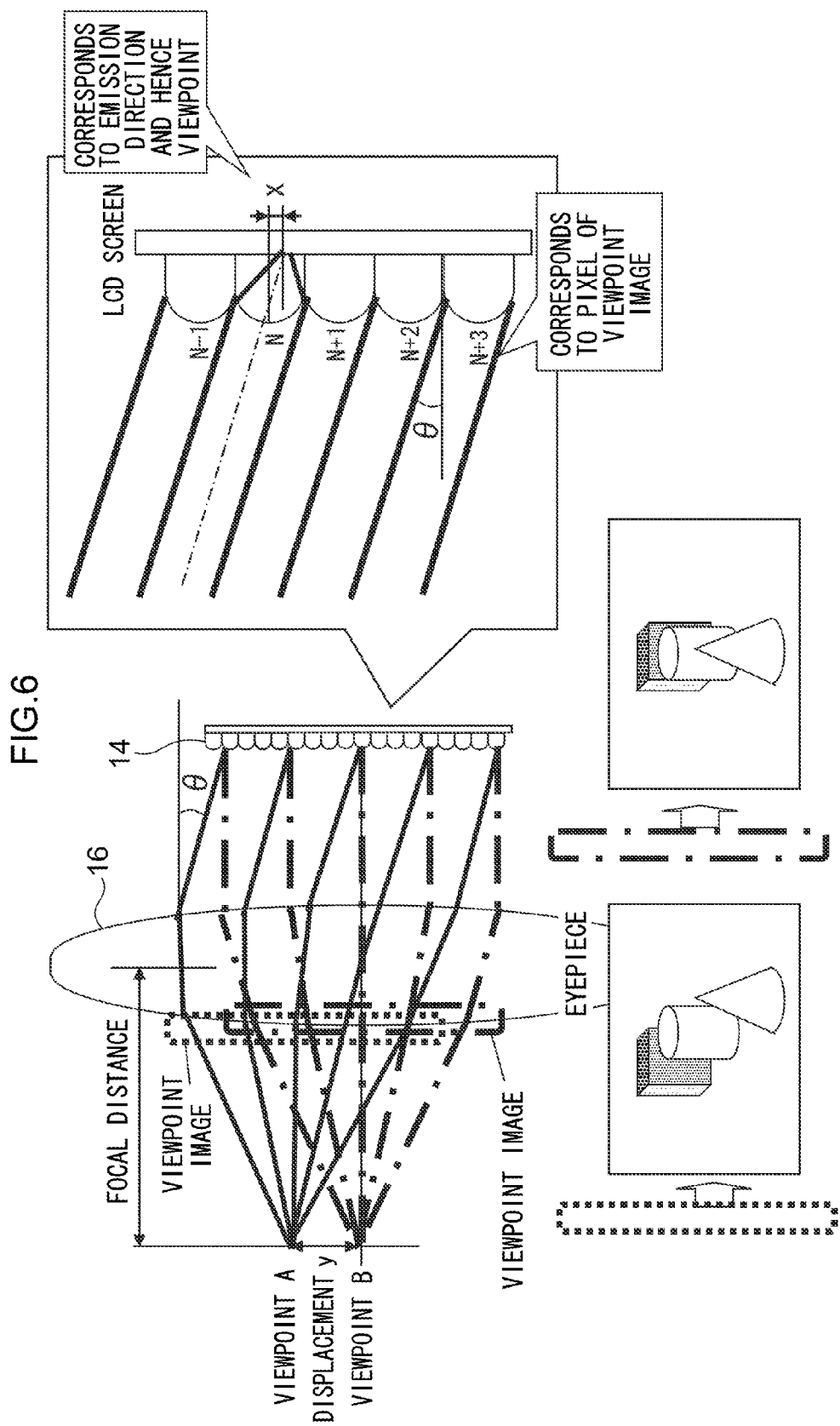
FIG. 6 is a schematic diagram illustrating a relationship between a shift amount x from the center of an elemental lens of the lenticular lens and a displacement amount y of a focal position.

As illustrated at the left hand side of FIG. 6, the eyepiece 16 focuses the parallel light arriving from the lenticular lens 14 side at positions separated from the eyepiece 16 by the focal distance of the eyepiece 16, and at positions displaced by a displacement amount y from the optical axis according to the incident angle θ. Virtual images of the viewpoint images can be viewed through the eyepiece 16 by viewing from these focal positions. In FIG. 6, the region encircled by the dotted broken line is an image observed from viewpoint A, and the region encircled by the dash-dot broken line is an image observed from viewpoint B. Examples of the images observed from the viewpoints A, B are illustrated as viewpoint images A, B in FIG. 6.

Accordingly, the viewpoint image observed changes by shifting eye position. When this is performed, the $N^{th}$ elemental lens of the lenticular lens 14 corresponds to the $N^{th}$ pixel configuring the viewpoint image in the pixel layout on the display face of the display 12, and the position (shift amount) x within each of the elemental lenses corresponds to the emission direction of parallel light and hence to the viewpoint position.

Figure 7:
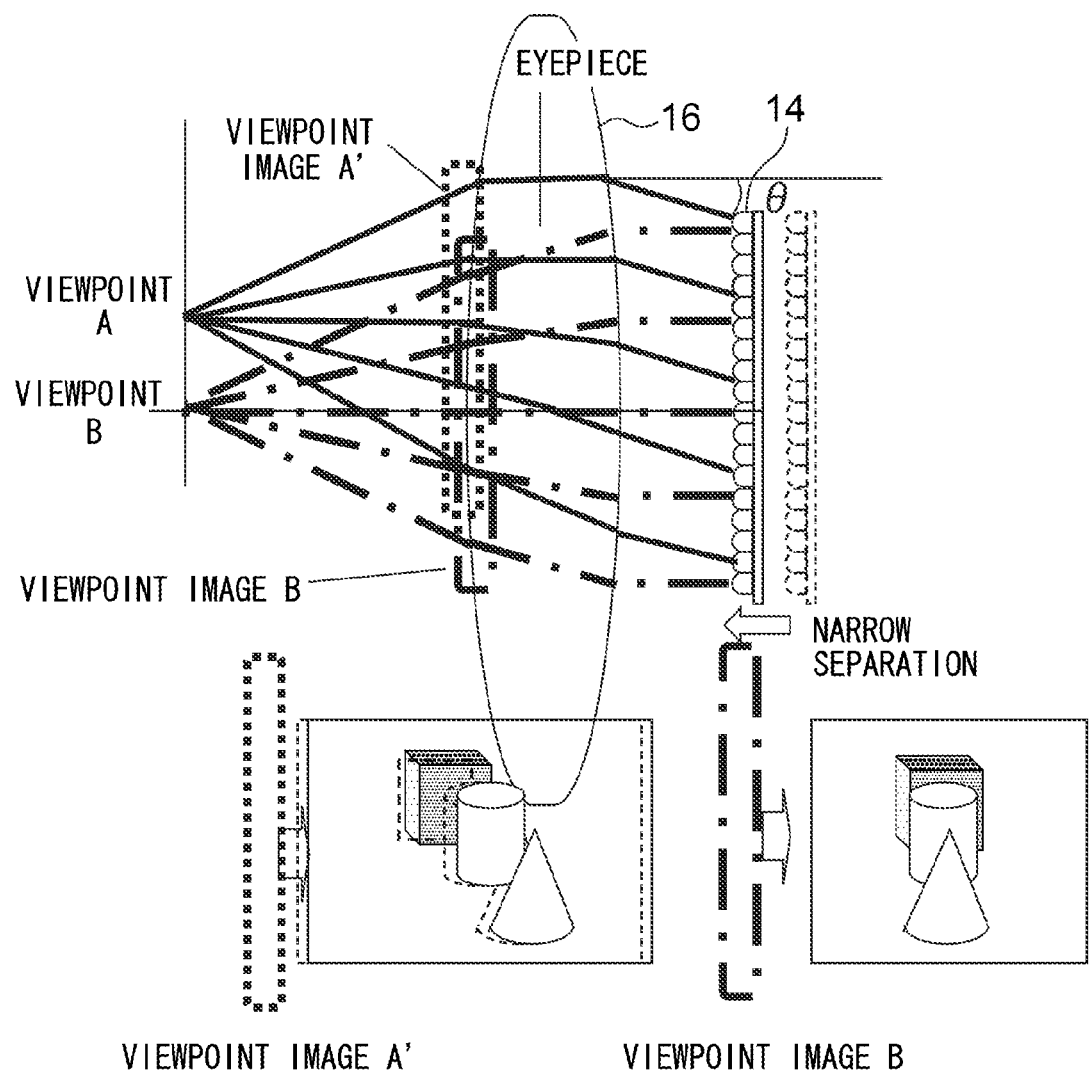
FIG. 7 is a schematic diagram illustrating a case in which an eyepiece is closer to the lenticular lens than in FIG. 6.

However, the following issue arises with the HMD 10 in rendering the above super-multi-view 3D display method. Namely, in FIG. 7 the distance of the eyepiece 16 to the lenticular lens 14 is closer than the distance illustrated in FIG. 6. The viewpoint image observed at each of the viewpoints is an image formed from pixels corresponding to the elemental lenses on reaching the lenticular lens 14 by tracing back the path of rays of light from each of the viewpoints. In FIG. 7, the rays of light paths from the viewpoint A do not all reach the same elemental lenses of the lenticular lens 14 as those in the viewpoint A in FIG. 6, but instead reach the elemental lenses that are one adjacent to the left. The viewpoint A in FIG. 7 is accordingly an image formed from pixels corresponding to the elemental lenses one adjacent to the left. Thus an image shifted to the right as illustrated by the dotted lines is visible as the viewpoint image A', resulting in inappropriate parallax between viewpoint images.

Figure 8:
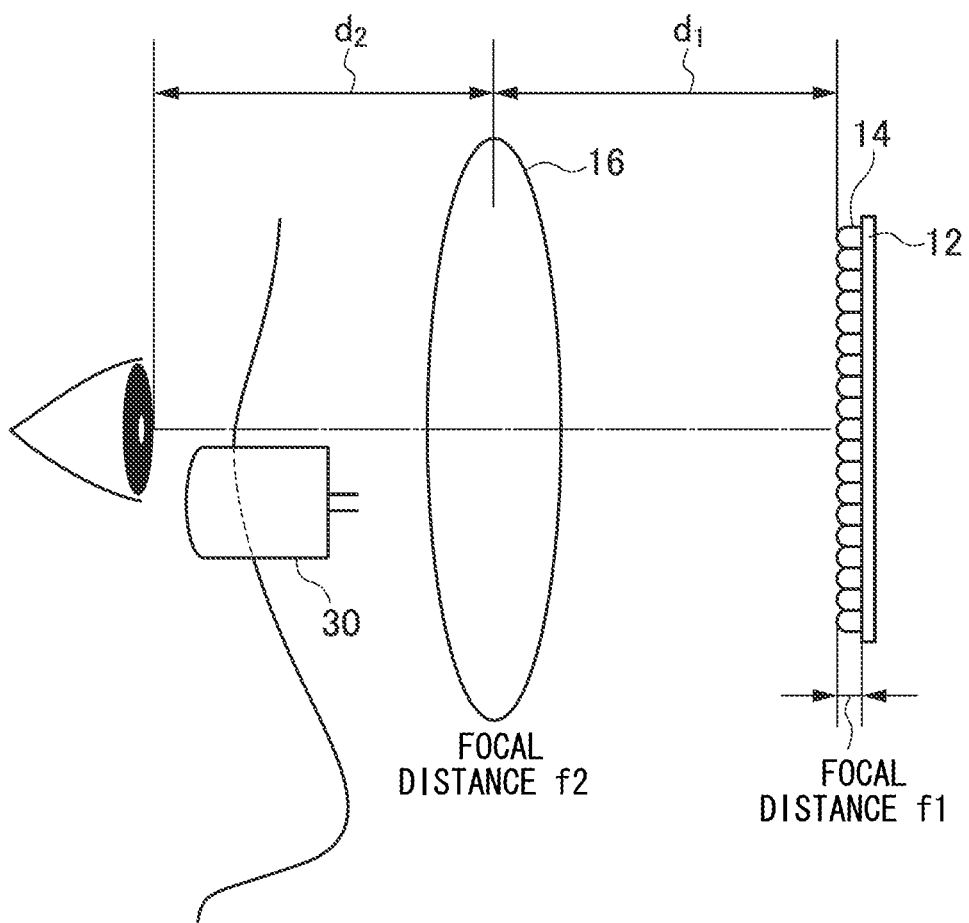
FIG. 8 is a schematic explanatory diagram of a layout of an optical system of the present exemplary embodiment.

In order to address this issue, in the present exemplary embodiment, as illustrated in FIG. 8, the position of the nose pad 30 that makes contact with the nose of a user when the HMD 10 is being worn by the user is set such that the following relationships hold, wherein f1 is the focal distance of the lenticular lens 14, f2 is the focal distance of the eyepiece 16 and distance d1 is the distance between the lenticular lens 14 and the eyepiece 16:

$$f2-f1 \le d1 \le f \qquad (1)$$

and viewing distance d2 from the eyepiece 16 is:

$$d2 \approx f2 \qquad (2)$$

Figure 9:
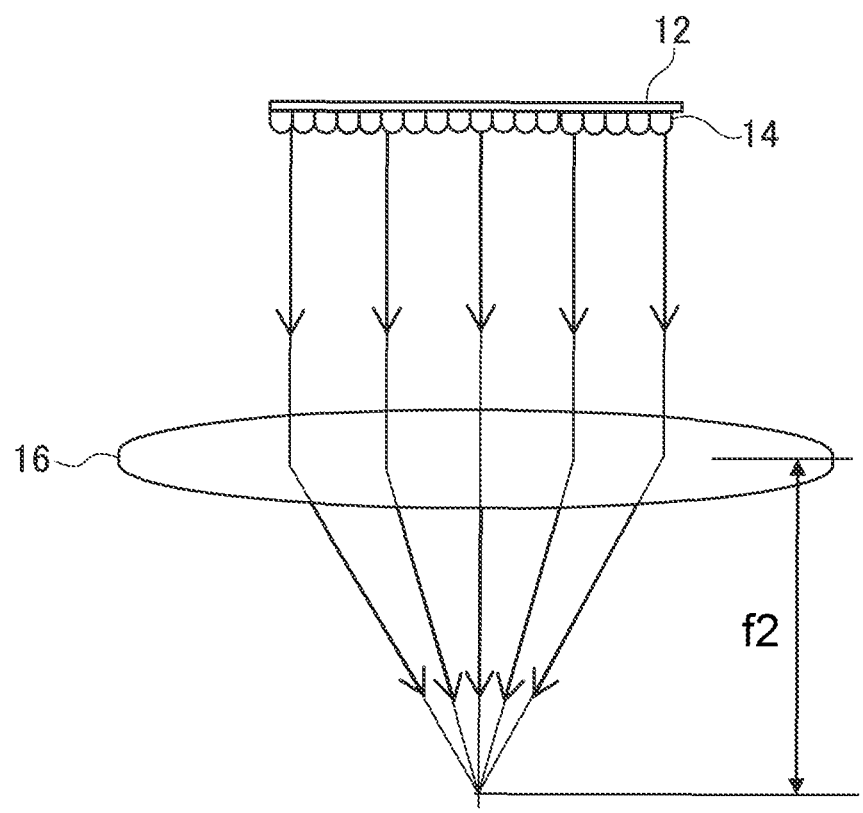
FIG. 9 is a schematic explanatory diagram of a process for deriving optical conditions.

Explanation follows regarding the principle (derivation process) of the optical conditions of the above Equation (1) and Equation (2). First consider the viewing distance d2 from the eyepiece, with reference to FIG. 9. In a configuration in which the lenticular lens 14 is adhered to the display face of the display 12 and the eyepiece 16 is disposed at a distance from the lenticular lens 14, parallel rays of light emitted from each of the elemental lenses of the lenticular lens 14 are converged to a point after first passing through the eyepiece 16. As illustrated in FIG. 9, for example the light rays emitted from pixels at the center from the elemental pixels corresponding to each of the elemental lenses of the lenticular lens 14 are converged at a point after first passing through the eyepiece 16. This means that the focal distance f2 of the eyepiece 16 is equivalent to the viewing distance d2.

Next, consider the distance d1 between the lenticular lens 14 and the eyepiece 16, with reference to FIG. 10. FIG. 10 is a diagram illustrating the paths of 5 rays of light emitted from the same elemental lens of the lenticular lens 14. The pixels of the same positions in each of the viewpoint images are corresponding to the same elemental lens of the lenticular lens 14. Based on this principle, rays of light for forming pixels at the same positions in each of the different viewpoint images pass through a single point of the same elemental lens of the lenticular lens 14. This means that the rays of light traced back from the viewpoints converge at a single point. From this it can be understood that the distance d1 between the lenticular lens 14 and the eyepiece 16 is ideally equivalent to the focal distance f2 of the eyepiece 16.

However, when the distance d1 slightly exceeds the focal distance f2 it is no longer possible to observe a virtual image through the eyepiece 16, and so the distance d1 between the lenticular lens 14 and the eyepiece 16 is not greater than the focal distance f2 of the eyepiece 16. In consideration of manufacturing tolerances it is more practical to set the distance d1 between the lenticular lens 14 and the eyepiece 16 shorter than the focal distance f2 in order to achieve a permissible range for the distance d1 between the lenticular lens 14 and the eyepiece 16. The following is a more detailed explanation of this condition.

Figure 11A:
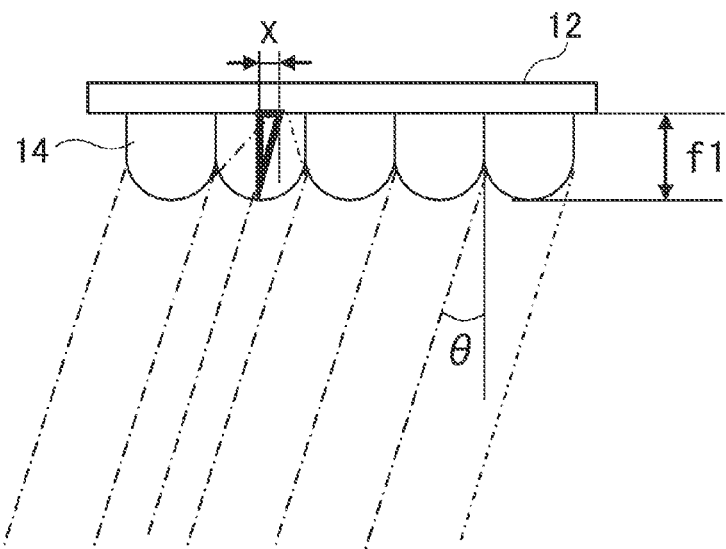
FIG. 11A and FIG. 11B are schematic explanatory diagrams of a process for deriving optical conditions.
Figure 11B:
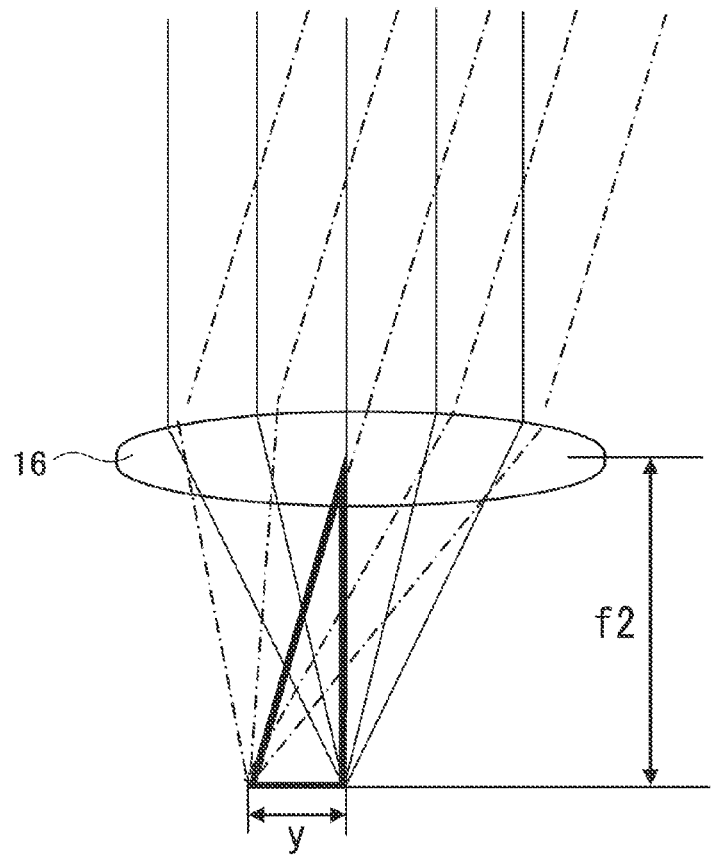

First, explanation follows regarding paths of rays of light formed by the lenticular lens 14 adhered to the display face of the display 12 and the eyepiece 16, with reference to FIG. 11A and FIG. 11B. The role of the lenticular lens 14 illustrated in FIG. 11A is to control such that the emission angle θ of the rays of light emitted as parallel beams accords with the shift amount x of the pixels positioned on the display face of the display 12 from the center position of the respective elemental lenses of the lenticular lens 14. Looking at the triangle depicted in bold in FIG. 11A gives a relationship equation of the emission angle θ to the shift amount x:

$$x = f1 \times \tan\theta \qquad (3)$$

The role of the eyepiece 16 illustrated in FIG. 11B is to converge the parallel light incident at incident angle θ to a position displaced by the displacement amount y from the optical axis of the eyepiece 16 that accords with the incident angle θ. Looking at the triangle depicted in bold in the FIG. 11B gives a relationship equation of the displacement amount y to the incident angle θ:

$$y = f2 \times \tan\theta \qquad (4)$$

An observer is able to observe a viewpoint image formed by parallel rays of light emitted from the lenticular lens 14 by observing from a position from the eyepiece 16 of viewing distance d2≈f2, as a virtual image through the eyepiece 16.

Figure 12A:
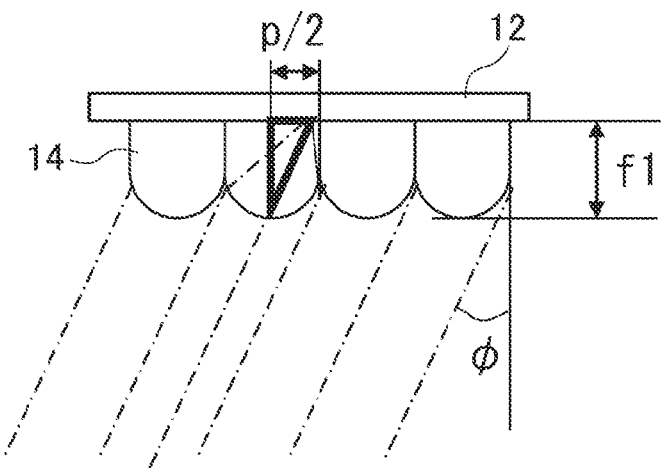
FIG. 12A and FIG. 12B are schematic explanatory diagrams of a process for deriving optical conditions.
Figure 12B:
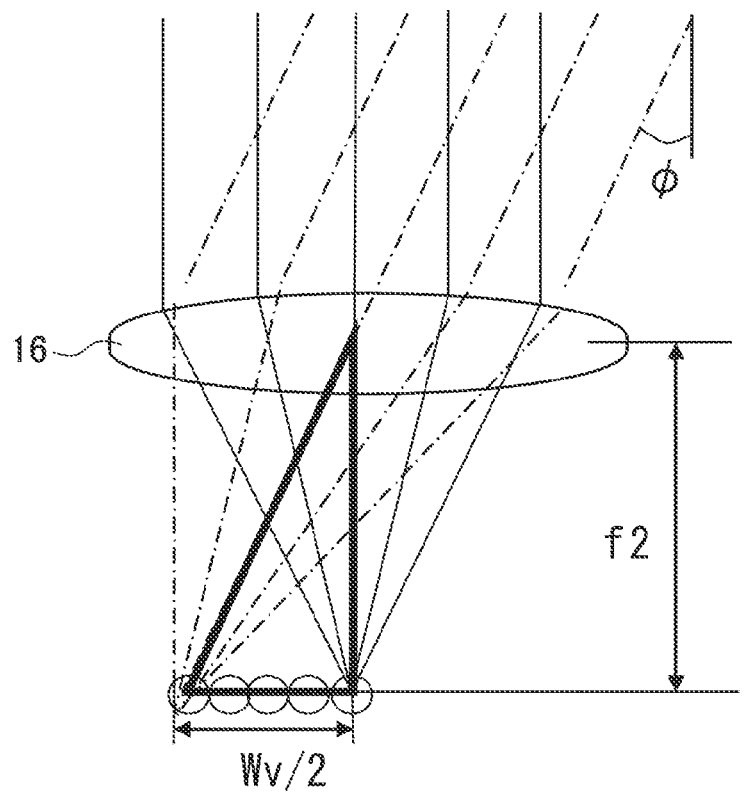

The relationship equation between the elemental lenses of the lenticular lens 14 and the viewing region will now be derived, with reference to FIG. 12A and FIG. 12B. When the viewing angle of the lenticular lens 14 is denoted 2φ then the maximum value for the emission angle θ of rays of light is φ. As illustrated in FIG. 12A and FIG. 12B, the width of each of the elemental lenses of the lenticular lens 14 is denoted p, and the viewing region width at the viewing position is denoted Wv. The base side x of the triangle is p/2 (From the triangle, Equation (3) is derived.). The base side y of the triangle is Wv/2 (From the triangle, Equation (4) is derived.). Accordingly, the following equations can be derived:

$$p/2 = f1 \times \tan\phi \qquad (5)$$

$$Wv/2 = f2 \times \tan\phi \qquad (6)$$

Eliminating tan φ in the above equations obtains the following Equation (7):

$$Wv = f2/f1 \times p \qquad (7)$$

Above Equation (7) is an equation expressing the relationship of the viewing region to the elemental lenses of the lenticular lens 14. The viewing region width Wv, and hence the inter-viewpoint density, can be designed by designing the focal distance f2 of the eyepiece 16 according to Equation (7). For a super-multi-view 3D display method, the viewing region width Wv is determined according to the pupil diameter of a person's eyes (viewing region width Wv≤pupil diameter), and since the inter-viewpoint distance is determined according to the viewing region width Wv and the number N of viewpoints, the focal distance f2 of the eyepiece 16 is designed based on these conditions.

Figure 13:
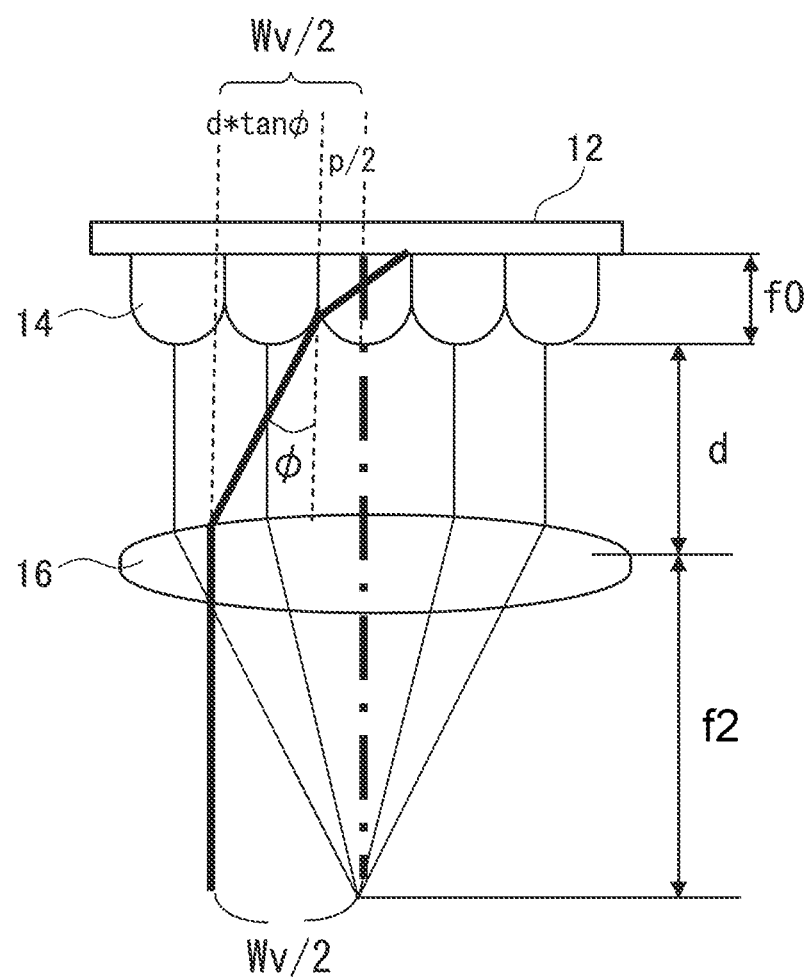
FIG. 13 is a schematic explanatory diagram of a process for deriving optical conditions.
Figure 14:
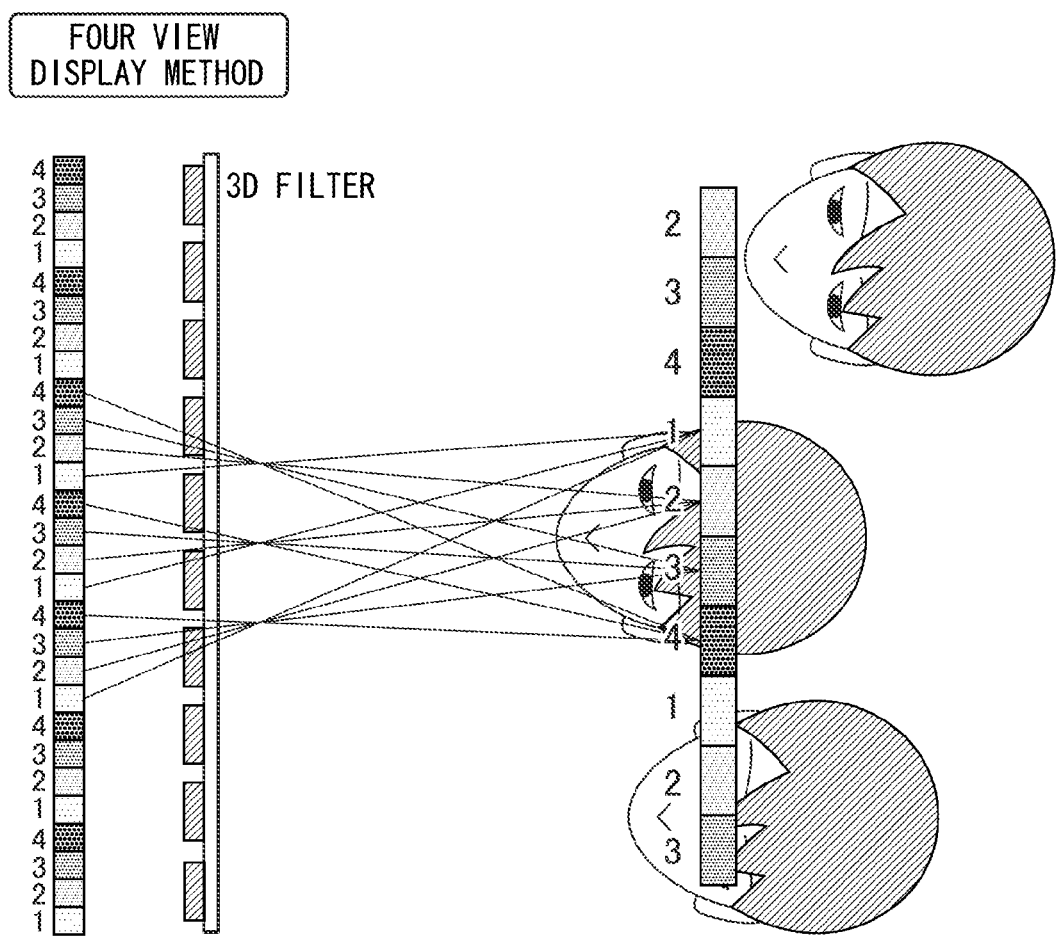
FIG. 14 is a schematic explanatory diagram of a multi-view 3D display method.
Figure 15A:
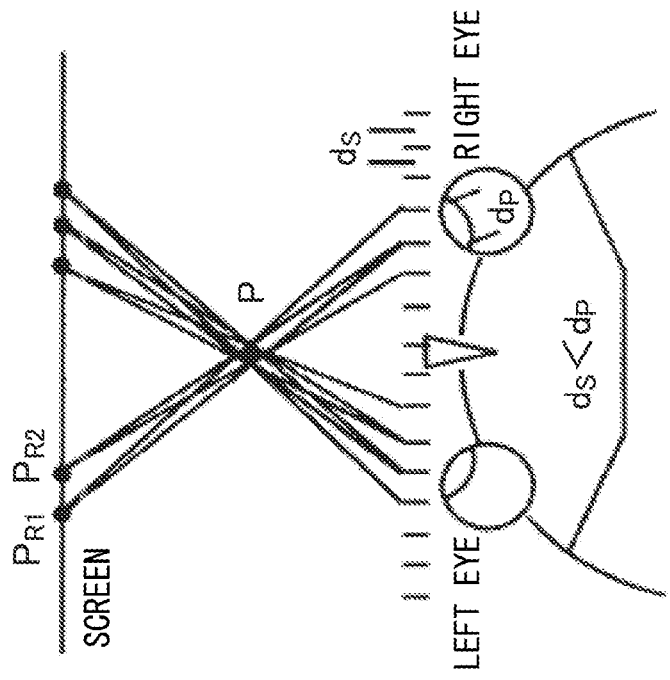
FIG. 15A and FIG. 15B are schematic diagrams illustrating differences between a multi-view 3D display method and a super-multi-view 3D display method.
Figure 15B:
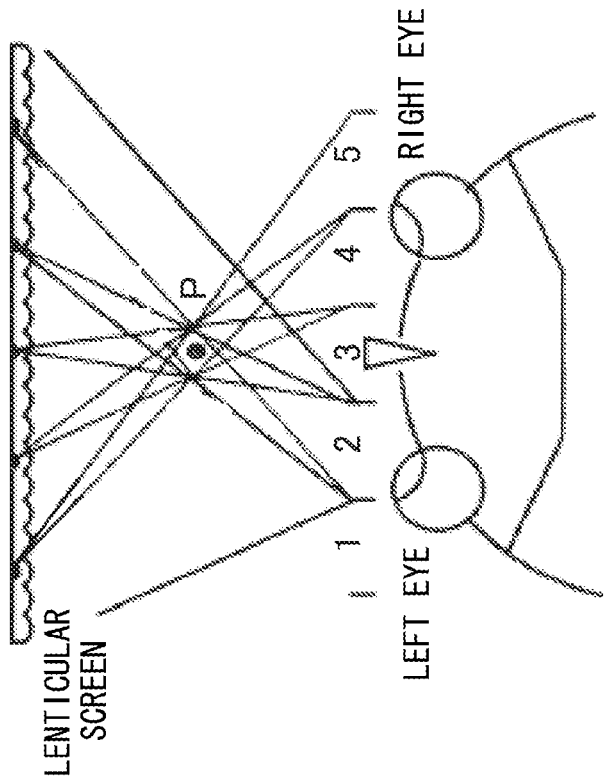
Figure 16B:
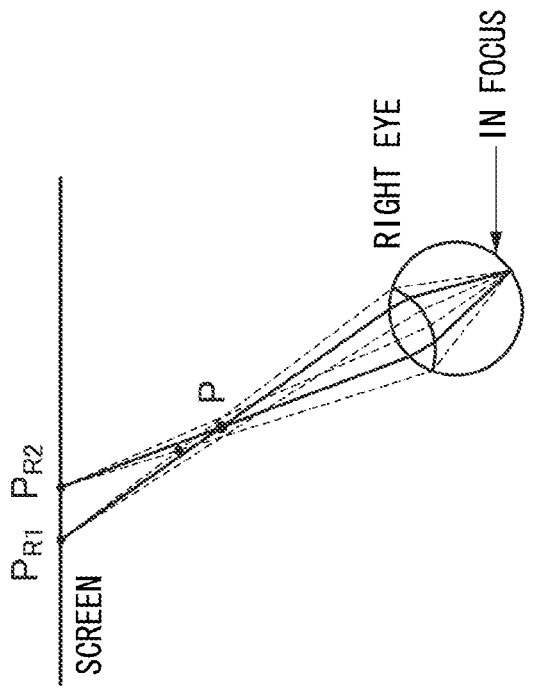
FIG. 16A and FIG. 16B are schematic diagrams illustrating induced lens in the eyeball adjustment in a super-multi-view 3D display method.
Figure 16A:
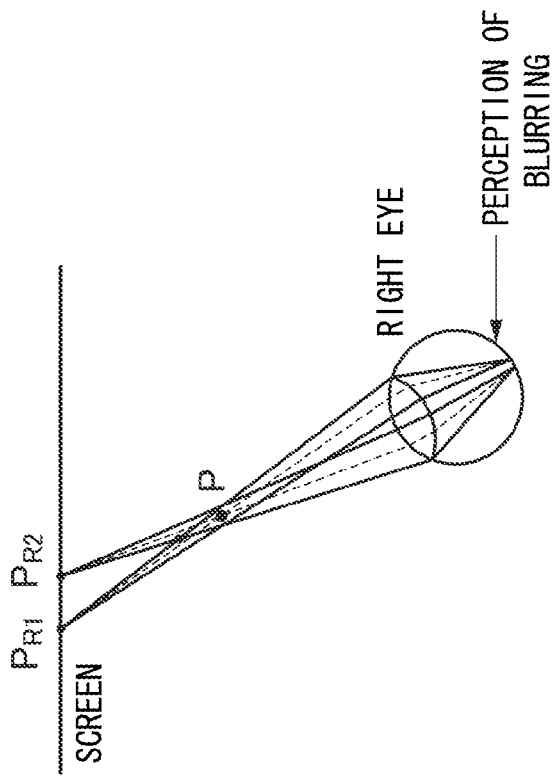

Next the conditions of the distance d1 between the lenticular lens 14 and the eyepiece 16 are illustrated, with reference to FIG. 13. When the lenticular lens 14 and the eyepiece 16 are disposed at a separation distance d, for a ray of light emitted from the lenticular lens 14 at emission angle θ=φ, the ray of light is incident to the eyepiece 16 at a position displaced with respect to the elemental lens that emitted the rays of light by d×tan φ. Tracing the path of a ray of light back from a first edge of the viewing region, as illustrated by the bold line in FIG. 13, as long as the path arrives at the lenticular lens 14 shifted by this amount then it will reach the correct elemental lens, however there is a problem if it reaches the adjacent elemental lens.

Expressing this in equation form:

$$Wv/2 - d \times \tan\phi \le p/2 \qquad (8)$$

Eliminating tan φ from Equation (8) using Equation (6) obtains the following Equation (9).

$$Wv/2 - (Wv/2) \times (d/f2) \le p/2 \qquad (9)$$

Dividing both sides of Equation (9) by Wv and multiplying by 2 obtains the following Equation (10).

$$1 - d/f2 \le p/Wv \qquad (10)$$

Rewriting the right hand side of Equation (10) using Equation (7) obtains the following Equation (11).

$$1 - d/f2 \le f1/f2 \qquad (11)$$

Rearranging Equation (11) obtains the following Equation (12).

$$d \ge f2 - f1 \qquad (12)$$

From the above it can be seen that for cases in which the distance d1 between the lenticular lens 14 and the eyepiece 16 is designed to be shorter than the focal distance f2 of the eyepiece 16, the permissible range is the focal distance f1 of the lenticular lens 14. Consequently, this can be understood as meaning that the manufacturing tolerance of the distance d1 between the lenticular lens 14 and the eyepiece 16 is made to the focal distance f1 of the lenticular lens 14 or lower. It can be understood that the design value of the distance d1 between the lenticular lens 14 and the eyepiece 16 may be determined in consideration of the manufacturing tolerance such that the upper limit value of the distance d1 is equivalent to the focal distance f2.

In the HMD 10 according to the present exemplary embodiment, the video image data reading section 24L respectively reads N individual sets of video image data with mutually different viewpoint positions as the video image data for the left eye from the video image data storage section 22, and outputs the read N individual sets of video image data to the pixel layout controller 28L. The video image data reading section 24R respectively reads N individual sets of video image data with mutually different viewpoint positions as the video image data for the right eye from the video image data storage section 22, and outputs the read N individual sets of video image data to the pixel layout controller 28R.

The N individual LPFs 32 of each of the pair of pixel layout controllers 28 perform processing to remove high frequency components in the left-right direction of the images for each frame of the N individual sets of video image data with mutually different viewpoint positions input from the video image data reading sections 24. The N individual down-sampling sections 34 of the pair of pixel layout controllers 28 perform down-sampling on each frame of the N individual sets of video image data output from the LPFs 32 to lower the resolution to 1/N by thinning pixels in the image left-right direction to a factor of 1/N.

The N individual selecting sections 36 and the pixel layout processor 38 of the pair of pixel layout controllers 28 extract respective single pixels from each fame corresponding to the N individual sets of video image data, and compose the elemental pixels by arranging the extracted N pixels in a specific sequence. This processing is performed for all the pixels of the N individual frames. The sequence here for the N individual pixels in each of the elemental pixels is the reverse of the sequence of viewpoint positions along the left-right direction of the original frames (video images) from which the N individual pixels are extracted. A single frame image is accordingly generated by combining the N individual frames for each of the frames of the N individual sets of video image data, and the generated frame images are displayed on the display 12.

Consequently, in a case for example where the number of viewpoints N=5, each pixel of frames of the video image corresponding to the viewpoint on the right edge of the 5 individual viewpoints is, as illustrated by pixel row 40A, 42A, 44A, 46A, 48A in FIG. 5, disposed at the left edges of the respective individual elemental pixels. Each of the pixels of frames of the video image corresponding to the viewpoint positioned second from the right is, as illustrated by 40B, 42B, 44B, 46B, 48B in FIG. 5, disposed at positions second from the left in the respective individual elemental pixels. Each of the pixels of frames of the video image corresponding to the viewpoint at the left-right direction center is, as illustrated by the pixel row 40C, 42C, 44C, 46C, 48C in FIG. 5, disposed at positions at the center of the respective individual elemental pixels. Each of the pixels of frames of the video image corresponding to the viewpoint position second from the left is, as illustrated in the pixel row 40D, 42D, 44D, 46D, 48D in FIG. 5, disposed at positions second from the right in the respective individual elemental pixels. Moreover, each of the pixels in frames of the video image corresponding to the viewpoint on the left edge is, as illustrated in the pixel row 40E, 42E, 44E, 46E, 48E of FIG. 5, disposed at the right edges in the respective individual elemental pixels.

As described above, the individual pixels of the frame images displayed on the display face of the display 12 collectively emit light from the lenticular lens 14 as parallel rays of light at an emission angle $\theta$ that accords with the shift amount x from the center portion of the corresponding elemental lens of the lenticular lens 14. The parallel beams of light arriving incident to the eyepiece 16 at the incident angle $\theta$ are converged to positions displaced from the optical axis of the eyepiece 16 by the displacement amount y that accords with the incident angle $\theta$.

The HMD 10 according to the present exemplary embodiment is configured such that the distance d1 between the lenticular lens 14 and the eyepiece 16 satisfies the Equation (1), and the viewing distance d2 from the eyepiece 16 satisfies Equation (2). The N individual viewpoint images (video images) formed at the N individual viewpoint positions are images in which the pixels that are at the same positions in each of the N individual viewpoint images are formed by light emitted from pixels corresponding to the same elemental lens of the lenticular lens 14. Consequently, in the HMD 10, appropriate display is rendered of a 3D image applied with a super-multi-view 3D display method.

Note that the nose pad 30 is given above as an example of a member for matching the viewing distance from the eyepiece 16 to the focal distance f2 of the eyepiece 16, however there is no limitation thereto. For example, a ring shape may be provided on the outer face of the housing body 18 of the HMD 10 at the periphery of the eyepiece 16, configured for example with a pad that makes contact with the skin of a user around the periphery of the eye region when the user is wearing the HMD 10.

Moreover, although a case has been illustrated in the drawings in which N=5 as an example of the number N of the viewpoint (viewpoint image), as long as N≥2 the number N of the viewpoints (viewpoint images) may also be 2 to 4, or may be 6 or greater.

Explanation has been given of the lenticular lens 14 as an example of a first optical section, however there is no limitation thereto and it is possible to apply a fly-eye lens array in the first optical section.

Explanation has been given above of display of video images (pictures), however it is possible to apply the technology disclosed herein to the display of still images.

According to the technology disclosed herein, appropriate display of a 3D image applied with a super-multi-view 3D display method can be realized in a configuration with an optical system configured to visualize a virtual image through an eyepiece.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

All cited documents, patent applications and technical standards mentioned in the present specification are incorporated by reference in the present specification to the same extent as if the individual cited documents, patent applications and technical standards are specifically and individually incorporated by reference in the present specification.

What is claimed is:

1. A 3D display device comprising:
a display section that extracts respective single pixels from corresponding N individual images with mutually different viewpoints, that composes an elemental pixel by arranging the N extracted pixels in a specific sequence along a specific direction for all the pixels of the N individual images and that displays a combined image in which the N individual images have been combined;
a first optical section of focal distance f1 provided with a group of small lenses arrayed along the specific direction, the respective individual small lenses being disposed along the specific direction so as to each correspond to mutually different single display regions of the elemental pixels in the display section and the respective individual small lenses separating rays of light emitted from the N pixels of the corresponding elemental pixels into N beams of parallel light with mutually different light ray directions; and a second optical section of focal distance f2 that converges the N beams of parallel light that are emitted from the first optical section and hit the individual small lenses by converging so as to offset the N beams from the optical axis, wherein a distance d1 between the first optical section and the second optical section satisfies $f2-f1 \leq d1 \leq f2$ and a viewing distance d2 from the second optical section satisfies $d2 \approx f2$.

2. The 3D display device of claim 1, wherein the distance d1 between the first optical section and the second optical section satisfies $d1=f2$.

3. The 3D display device of claim 1, wherein the first optical section is a lenticular lens, and the specific sequence is the reverse sequence to the disposed sequence of viewpoints along the specific direction of the original N individual images from which each of the N pixels is extracted.

4. A 3D display method comprising:

disposing a display section, a first optical section and a second optical section so that a distance d1 between the first optical section and the second optical section satisfies $f2-f1 \leq d1 \leq f2$ and a viewing distance d2 from the second optical section satisfies $d2 \approx f2$; and displaying a combined image on the display section, wherein the display section extracts respective single pixels from corresponding N individual images with mutually different viewpoints, composes an elemental pixel by arranging the N extracted pixels in a specific sequence along a specific direction for all the pixels of the N individual images and displays the combined image in which the N individual images have been combined, the first optical section of focal distance f1 is provided with a group of small lenses arrayed along the specific direction, the respective individual small lenses being disposed along the specific direction so as to each correspond to mutually different respective single display regions of the elemental pixels in the display section and the individual small lenses separating rays of light emitted from the N pixels of the corresponding elemental pixels into N beams of parallel light with mutually different light ray directions, and the second optical section of focal distance f2 converges the N beams of parallel light that are emitted from the first optical section and hit the individual small lenses by converging so as to be offset from the optical axis.

5. The 3D display method of claim 4, wherein the first optical section and the second optical section are disposed such that the distance d1 between the first optical section and the second optical section satisfies $d1=f2$.

6. The 3D display method of claim 4, wherein the first optical section is a lenticular lens, and the specific sequence is the reverse sequence to the disposed sequence of viewpoints along the specific direction of the original N individual images from which each of the N pixels is extracted.

* * * * *